US 9,253,755 B2

(12) United States Patent
Williams et al.

(10) Patent No.: US 9,253,755 B2
(45) Date of Patent: Feb. 2, 2016

(54) HIGH PERFORMANCE MOBILITY NETWORK WITH AUTOCONFIGURATION

(71) Applicant: BelAir Networks Inc., Kanata (CA)

(72) Inventors: Chris Williams, Nepean (CA); Eric Johnson, Nepean (CA); Dave Park, Kanata (CA); Marcel Chenier, Gatineau (CA); Stephen Rayment, Ottawa (CA); Roland A. Smith, Nepean (CA)

(73) Assignee: ERICSSON WIFI INC., Plano, TX (US)

( * ) Notice: Subject to any disclaimer, the term of this patent is extended or adjusted under 35 U.S.C. 154(b) by 216 days.

(21) Appl. No.: 13/650,365

(22) Filed: Oct. 12, 2012

(65) Prior Publication Data

US 2013/0107820 A1    May 2, 2013

Related U.S. Application Data

(62) Division of application No. 12/496,398, filed on Jul. 1, 2009, now Pat. No. 8,290,440.

(60) Provisional application No. 61/077,697, filed on Jul. 2, 2008.

(51) Int. Cl.
| | |
|---|---|
| *H04B 7/00* | (2006.01) |
| *H04W 72/02* | (2009.01) |
| *H01Q 1/24* | (2006.01) |
| *H01Q 21/20* | (2006.01) |
| *H04W 16/28* | (2009.01) |
| *H04W 76/02* | (2009.01) |
| *H04W 88/02* | (2009.01) |
| *H04W 88/08* | (2009.01) |
| *H04W 84/18* | (2009.01) |

(52) U.S. Cl.
CPC .............. *H04W 72/02* (2013.01); *H01Q 1/246* (2013.01); *H01Q 21/205* (2013.01); *H04W 16/28* (2013.01); *H04W 76/02* (2013.01); *H04W 84/18* (2013.01); *H04W 88/02* (2013.01); *H04W 88/08* (2013.01)

(58) Field of Classification Search
CPC ........ H04H 60/02; H04H 20/65; H04L 12/06; H04L 12/12; H04L 12/403; H04L 12/40182; H04L 12/4011
USPC .......... 370/277, 302, 389, 449, 332, 334, 310
See application file for complete search history.

(56) References Cited

U.S. PATENT DOCUMENTS

| | | | | |
|---|---|---|---|---|
| 5,475,866 | A * | 12/1995 | Ruthenberg | .......... H04W 84/08 455/454 |
| 5,818,389 | A * | 10/1998 | Lazar | ............................ 342/383 |
| 6,075,997 | A * | 6/2000 | Lindqvist et al. | ............. 455/561 |
| 7,483,696 | B1 * | 1/2009 | Mitchell | ....................... 455/431 |
| 7,778,226 | B2 * | 8/2010 | Rayzman et al. | ............. 370/337 |
| 7,941,138 | B2 * | 5/2011 | Thermond et al. | ......... 455/426.1 |
| 2003/0043773 | A1 * | 3/2003 | Chang | .......................... 370/338 |
| 2004/0106412 | A1 * | 6/2004 | Laroia et al. | .................. 455/448 |
| 2004/0114535 | A1 * | 6/2004 | Hoffmann et al. | ............ 370/252 |

(Continued)

*Primary Examiner* — Ricky Ngo
*Assistant Examiner* — Dewanda Samuel
(74) *Attorney, Agent, or Firm* — Katten Muchin Rosenman LLP

(57) ABSTRACT

A high performance wireless mesh architecture which has been optimized for mobile end points is described. The mesh architecture is intended for Navy applications, where the wireless mesh network extends between mobile ships and includes ship-to-shore links, but it is equally applicable to other mobile elements on, in, or under land, air, sea, or space.

6 Claims, 10 Drawing Sheets

(56) References Cited

U.S. PATENT DOCUMENTS

| | | | |
|---|---|---|---|
| 2004/0147223 A1* | 7/2004 | Cho | H04L 12/66 455/41.2 |
| 2004/0196834 A1* | 10/2004 | Ofek et al. | 370/352 |
| 2005/0003865 A1* | 1/2005 | Lastinger et al. | 455/562.1 |
| 2005/0285803 A1* | 12/2005 | Iacono et al. | 343/702 |
| 2006/0038738 A1* | 2/2006 | Shtrom | 343/876 |
| 2006/0057964 A1* | 3/2006 | Roy et al. | 455/67.11 |
| 2006/0098598 A1* | 5/2006 | Gallagher | 370/331 |
| 2006/0192720 A1* | 8/2006 | Shtrom | 343/795 |
| 2008/0267133 A1 | 10/2008 | Shida et al. | |
| 2009/0168650 A1 | 7/2009 | Kesselman | |
| 2011/0281603 A1 | 11/2011 | Lastinger et al. | |

\* cited by examiner

HIGH PERFORMANCE MOBILITY NETWORK WITH AUTOCONFIGURATION

CROSS-REFERENCE TO PRIOR APPLICATIONS

This application is a Divisional of U.S. patent application Ser. No. 12/496,398, filed Jul. 1, 2009, which claims priority to U.S. Provisional Patent Application No. 61/077,697, filed Jul. 2, 2008, the entire contents of which are incorporated herein by reference.

BACKGROUND OF THE INVENTION

1. Field of the Invention

This invention describes a high performance wireless mesh architecture which has been optimized for mobile end points. It is intended for Navy applications, where the wireless mesh network extends between mobile ships and includes ship-to-shore links, but it is equally applicable to other mobile elements on, in, or under land, air, sea, or space.

2. Related Art

Naval ships have relied on hardwired connections for network LAN connectivity while in harbor. Under non-combative conditions, these ships disable high powered military band communications when in close proximity to port, to minimize interference with civilian communications systems. This invention provides a high performance wireless mesh network, which connects the naval ships to the naval port communications LAN. This patent describes the nodes used in the network, network design with mobility specific features, and the controller and algorithms used including the method of automatic connectivity of multiple point-to-point (P2P) mobile ship radios to fixed shore side radios. Multi-radio P2P mesh switch-routers perform automatic discovery and connectivity of point to point links as RF link line of sight is created. This invention is the first realization of such a network for naval applications. Prior to this invention, no wideband wireless near shore communication systems were employed.

This invention is equally applicable to other mobile elements such as soldiers, animals, or vehicles which traverse over, through, or under the land, sea, air, or space.

SUMMARY OF THE INVENTION

In one aspect, the invention provides a network for maintaining communication. The network comprises: a plurality of nodes, each node being one of a base transceiver station and a mobile station and being configured to communicate with one of a plurality of substantially like nodes; a plurality of radio modules associated with each node, each radio module being configured for establishing a link with a radio module associated with one of the other nodes; a mobility controller associated with each node, each mobility controller being configured for controlling the radio modules associated with that node; and a plurality of directional antennas associated with each node, each directional antenna being configured for maintaining one of the links concurrent to another of the antennas for maintaining another link. The links may be between any combination of base transceiver stations and mobile stations. At least a first node of the plurality of nodes may comprise a base transceiver station, and at least a second node of the plurality of nodes may comprise a mobile station. The at least first node may comprise at least a first radio module and a second radio module of the plurality of radio modules, and a first directional antenna and a second directional antenna of the plurality of directional antennas. The at least second node may comprise at least a third radio module and a fourth radio module of the plurality of radio modules, and a third directional antenna and a fourth directional antenna of the plurality of directional antennas. The at least first and third directional antennas may be configured to maintain an active link. The at least second and fourth directional antennas may be configured to maintain a standby link.

In another aspect, the invention provides a node in a network. The node is one of a base transceiver station and a mobile station. The node is configured to communicate with one of a plurality of substantially like nodes. The node comprises: a first radio module and a second radio module, each radio module being configured to establish a link with a radio module associated with another of the plurality of nodes; a mobility controller configured for controlling the first and second radio modules; and a plurality of directional antennas, each directional antenna being configured for maintaining one of the links concurrent to another of the antennas for maintaining another one of the links. When the node is a mobile station, the node may further include at least two high gain directional antennas.

In yet another aspect, the invention provides a method of communication in a network. The network comprises a plurality of nodes, each node being one of a base transceiver station and a mobile station and configured for communicating with one of a plurality of substantially like nodes. The method comprises the steps of: a) using a base transceiver station to transmit beacons, the beacons comprising a media access control identifier specific to a radio module associated with the base transceiver station and a usage indicator; b) using a mobile station to scan for beacons; c) using the mobile station to sort the detected beacons according to a criterion selected from the group consisting of signal strength and signal-to-noise ratio; d) establishing a first radio link between the mobile station and the radio module associated with the base transceiver station, wherein the selected radio module corresponds to the beacon having a greatest signal strength; e) setting the usage indicator of the selected radio module to an unavailable status; and f) repeating steps a, b, and c. The method may further comprise the step of: g) establishing a second radio link by repeating steps a, b, c, and d, wherein no radio traffic is carried. The method may further comprise the step of: h) when the signal strength of the first radio link has reached a predetermined level, using the second radio link to transmit data and terminating the first radio link. Step c may further comprise the step of using the mobile station to sort the detected beacons according to signal strength. Alternatively, step c may further comprise the step of using the mobile station to sort the detected beacons according to signal-to-noise ratio.

DETAILED DESCRIPTION OF THE INVENTION

Figure 1:
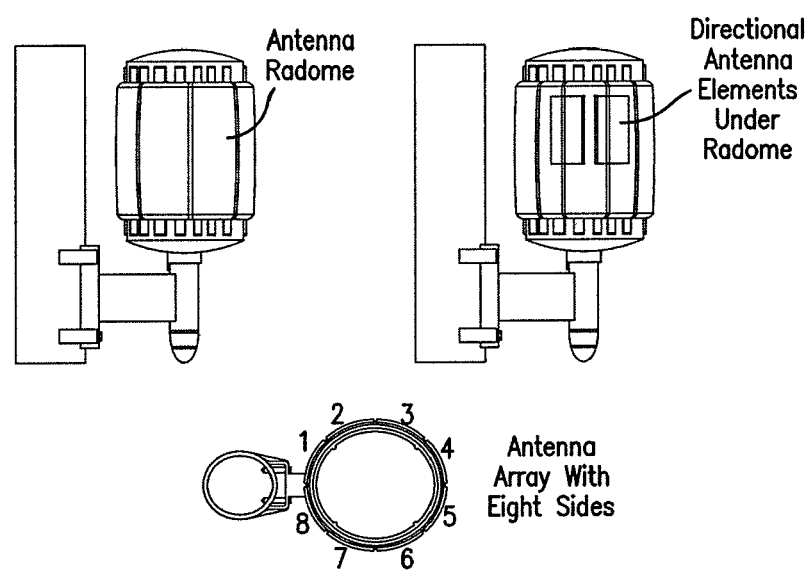
FIG. 1 shows an illustration of a radio transceiver with a directional antenna array that is intended for use as a base transceiver station node according to a preferred embodiment of the invention.

The present invention details a wireless mobility network consisting of fixed and mobile nodes. Unlike traditional cellular or packet data networks, where the fixed network consists of multi-radio base transceiver stations (BTSs), and single radio cell phones or mobile stations (MSs), this invention employs multiple radios in both the BTSs and MSs.

Furthermore, and unlike traditionally wireless networks where the BTS typically employ directional antennas most often in a sectorized arrangement, and the MSs utilize omni-directional antennas, the present invention employs directional antennas at both the BTS and MS end points. In addition, unique to the present invention is that the MSs, as described above containing multiple radios, also contain at a minimum, two high gain directional antennas.

All nodes—fixed (BTSs) and mobile (MSs), include a mobility controller (MC) that controls two or more radio modules (RMs), and where each radio module selects two or more directional or omni-directional antennas.

Multiple variations of RMs are employed depending on spectrum availability and throughput requirements. For operation in the 24000-2483.5 MHz ISM band, an Access RM (ARM) is employed. Two versions of RMs called the Backhaul Radio Module (BRM3, BRM4), and the Enhanced Radio Modules (ERM1, ERM2) are employed for 5250-5850 MHz unlicensed band operation. A Military band RM (MRM) is employed for 4400-4940 MHz operation. A Public Safety band RM (PSM) is employed for licensed 4940-4990 MHz operation. A Japanese RM (JRM) is employed for 4900-5100 MHz operation. A Transport RM (TRM) is employed for operation in the Intelligent Transport System (ITS) band from 5850-5925 MHz. An IEEE 802.16d WiMAX RM (WRM) is employed for operation in the licensed bands of 2300-2360 MHz (WRM1), 2500-2700 MHz (WRM2, WRM3), 3500-3900 MHz (WRM4), and unlicensed band of 5250-5850 MHz (WRM5). As new technologies become available enabling new services, enhanced performance, or customer specific requirements, the RMs used to form the P2P links may change. For example, higher frequency "common carrier" RMs (CRMx) may be employed to utilize common carrier spectrum at 6 GHz, 11 GHz, 13 GHz, 19 GHz, 23 GHz and 28 GHz for example. Although this spectrum is carefully controlled and licensed by the FCC for fixed wireless links, its application in naval harbors, air force bases, and army bases is controlled by NTIA, and may be used for this application, with assurances of control over radio frequency spill into civilian territories. Additionally, multiple and different RMs may be employed in the same BTS or MS.

With two or more RMs, the MC can maintain fully redundant links on the same or independent frequencies, to ensure high resiliency to interference from known or unknown sources. With two or more radios, the mobility controller is able to mesh with other mobile or fixed nodes, providing multiple independent links to further guarantee network performance. The high performance point-to-point (P2P) radios provide narrow beamwidth radio frequency links enabling high interference rejection characteristics for both unlicensed and licensed frequencies. Such high gain P2P links ensure optimal radio link performance, for high throughput and low latency to transport voice and data IP and pseudo-wire streams.

In accordance with one or more embodiments of the present invention, each BTS node contains four IEEE 802.11n MRM radios, where each MRM is able to selects one of two directional antennas. The embodiment requires two MS configurations: one for smaller fleet ships contains two MRM radios each connected to a single directional antenna; and one for larger fleet ships, such as air craft carriers, contains up to four MRMs. In the BTS, the MC dynamically selects the optimum MRM according to the algorithms described in this application, and associated antennas to maintain independent wireless links to other BTS or MS nodes. In the MS, the MC dynamically selects the optimum MRM for a primary link, and the alternate MRM for a secondary link. Although the MRM utilizes the IEEE 802.11n standard, and operates in the 4400-4940 MHz military spectrum, anyone of multiple standard or proprietary wireless interface technologies, and anyone of multiple licensed or unlicensed bands may have been employed.

The invention includes a fully redundant network path to a fixed node where any one of multiple network physical layer connections may be used to connect to the wired LAN. These interfaces may exist on any of the fixed or mobile nodes and include, but are not limited to 10/100/1000BASE-TX, T1/E1/T3/E3 or other TDM interfaces carrying TDM traffic or packet data tunneled over TDM interfaces; optical interfaces such as 100/1000BASE-FX or PON (Passive Optical Network); DSL (Digital Subscriber Line) interfaces; broadband interface such as DOCSIS, serial interfaces such as RS232, Firewire, USB1 or USB2.0 or its derivatives, parallel interfaces such as SCSI, or other, multiple analogue interfaces, and any form of proprietary interface including a wireless interface, standard or proprietary to the wired LAN.

Referring to FIG. 1, in accordance with one or more embodiments of the present invention, FIG. 1 shows the BelAir200D physical view with four RMs each with 2 antennas. This figure relates to the embodiment of the BTS which has eight RMs and two antennas per RM. The antennas need not be co-located with the BTS.

Figure 2:
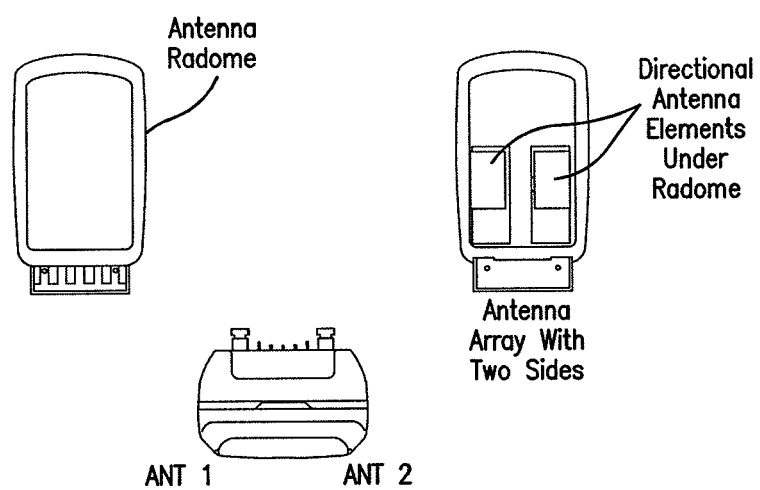
FIG. 2 shows an illustration of a radio transceiver with a directional antenna array that is intended for use as a mobile station node according to a preferred embodiment of the invention.
Figure 3:
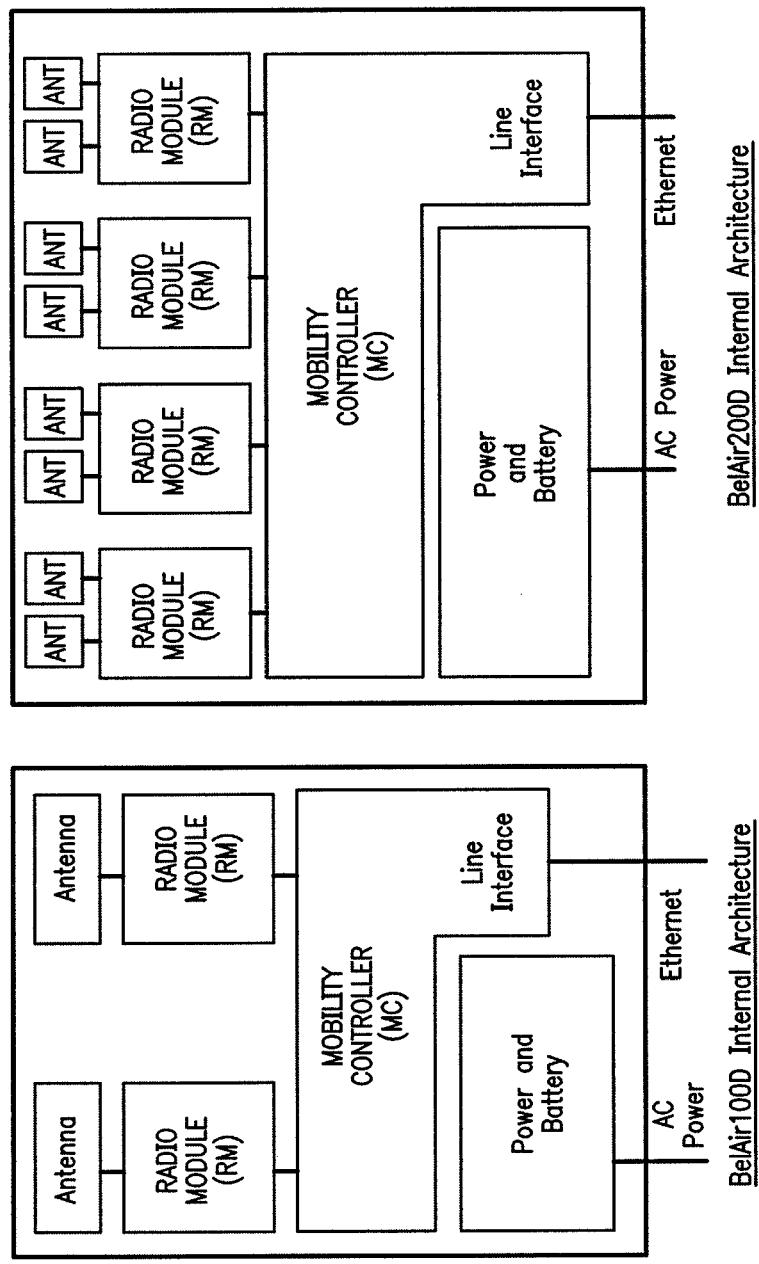
FIG. 3 shows internal architectures for the radio transceivers of FIGS. 1 and 2, respectively.

Referring to FIGS. 2 and 3, FIG. 2 shows the BelAir100D physical view with two RMs each with 1 antenna which is the preferred embodiment of the MS. The antennas may not be co-located with the MS. FIG. 3 shows the BelAir100D and BelAir200D logical architectures with MC, RM, antennas, and LIM ports.

Figure 4A:
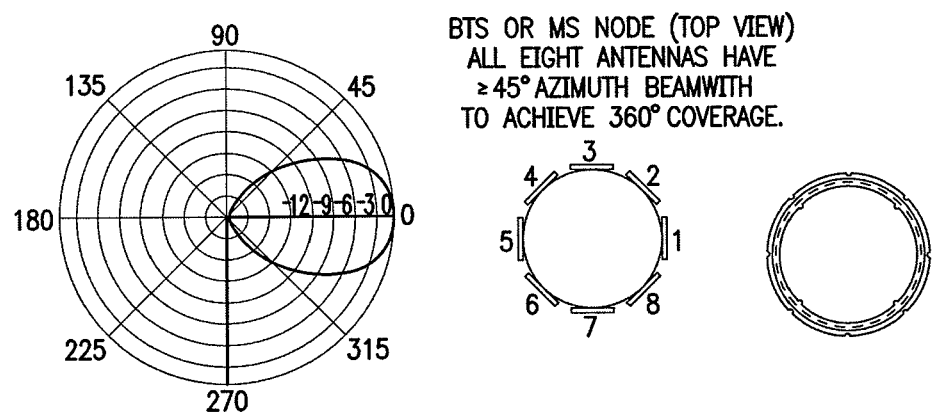
FIGS. 4A, 4B, and 4C show alternative antenna configurations for the radio transceivers of FIGS. 1 and 2.
Figure 4B:
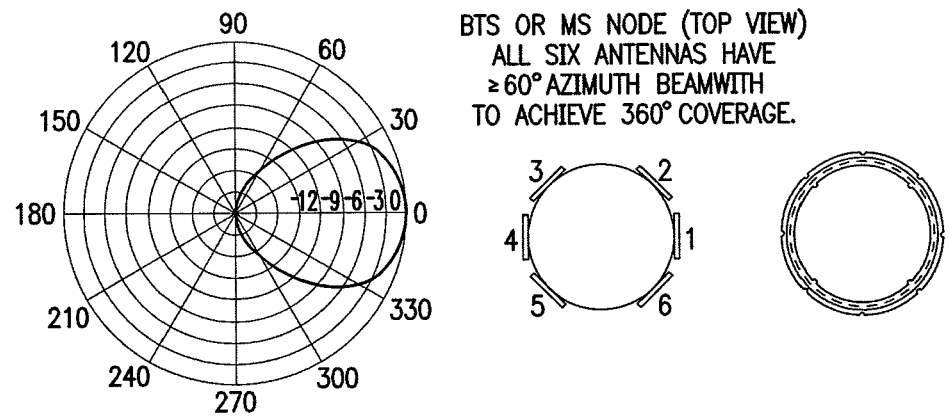
Figure 4C:
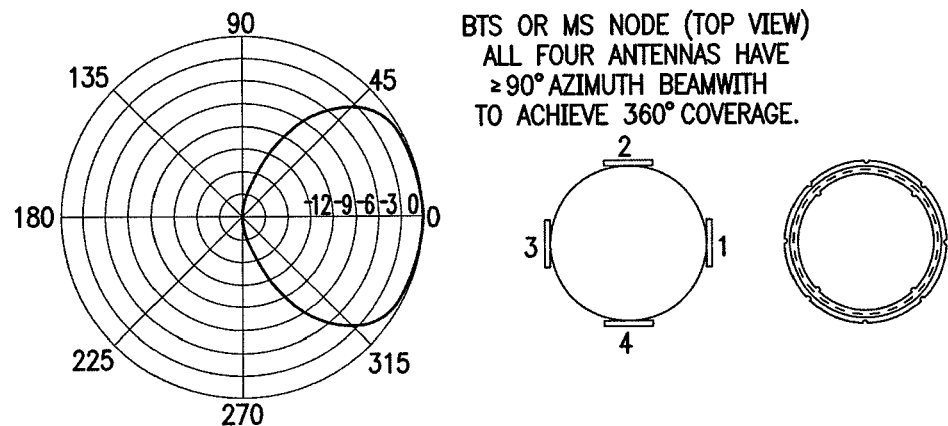

Referring to FIGS. 4A, 4B, and 4C, these figures show a plurality of variations on antenna configurations for each device. FIG. 4A shows the case of eight antennas, each with an azimuth beamwidth (polar plot) of at least 45 degrees, so that the eight antennas form a 360 degree contiguous coverage. FIG. 4B shows the case of six antennas, each with an azimuth beamwidth (polar plot) of at least 60 degrees, so that the six antennas form a 360 degree contiguous coverage. FIG. 4C shows the case of four antennas, each with an azimuth beamwidth (polar plot) of at least 90 degrees, so that the four antennas form a 360 degree contiguous coverage. These figures show embodiments of the MS and BTS systems; however, anyone knowledgeable in the area can realize variations on this using different numbers of antennas, or multiple units to provide the 360 degrees of coverage.

The antenna configurations shown in FIGS. 4A, 4B, and 4C show non-overlapping coverage. As the antennas may be internal or external, it is anticipated that these antenna patterns may need to be fully overlapping. This is especially true for long distant links, where the MS node is locates several miles from the redundant BTS nodes. The angle between the two RF links will be minimal, requiring antennas to be effectively pointing in the same direction.

Figure 5:
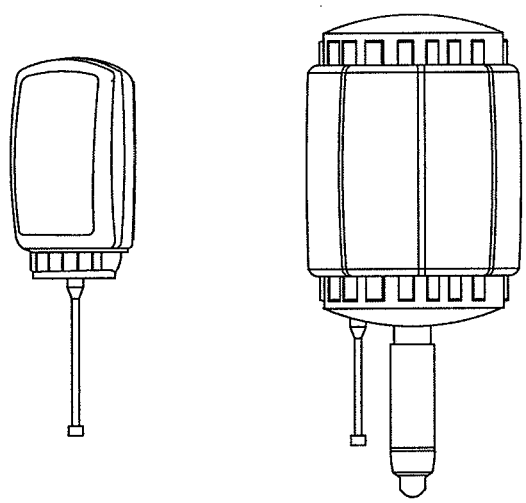
FIG. 5 shows an alternative omnidirectional antenna for use with the radio transceivers of FIGS. 1 and 2.

Referring to FIG. 5, FIG. 5 shows an optional omnidirectional antenna designed for use on the BelAir100D/BelAir200D. This antenna enables alternate variants of those cases shown in FIGS. 4A, 4B, and 4C where the omnidirectional antenna is used to ensure contiguous coverage where antenna patterns do not fully achieve 360 degrees of coverage.

Figure 6:
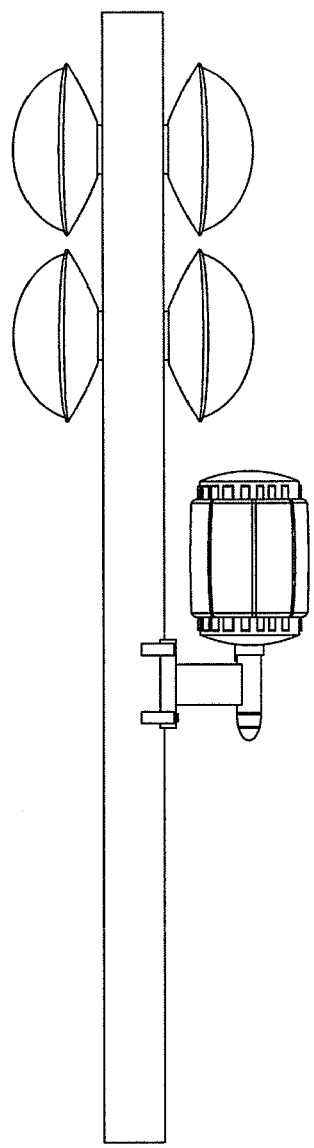
FIG. 6 shows an external high gain parabolic antenna for use with the radio transceiver of FIG. 1.

Referring to FIG. 6, FIG. 6 shows the BelAir200D with external high gain parabolic antennas for shore mounting and long distance links into the harbor. These high gain antennas have narrow beam widths of 4-12 degrees requiring multiple antennas, each angled to create a contiguous coverage of the oceans approach to a harbor. The high gain antennas, as high as 32 dBi, yield a high capacity link to a remote MS many miles away. Multiple technologies may be used for these applications including vertical/horizontal polarization diversity, which is available on all antenna types, or circularly polarized antennas with different left/right spins.

Figure 7:
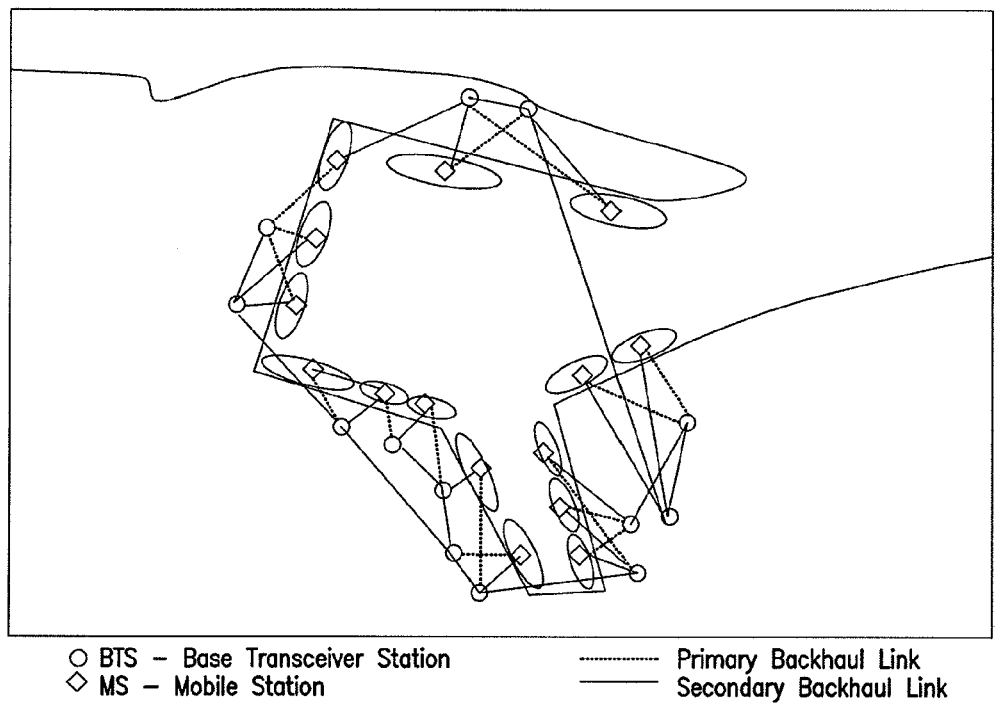
FIG. 7 shows an exemplary configuration of base station transceiver nodes and mobile transceiver nodes according to a preferred embodiment of the invention.

Referring to FIG. 7, in accordance with one or more embodiments of the present invention, FIG. 7 shows a pier-side network configuration of BTS and MS nodes. This network configuration shows the links: BTS to BTS; BTS to MS; and MS to MS. This network configuration also shows redundant paths where the solid lines are the main path, and the dotted lines are the redundant paths.

Figure 8A:
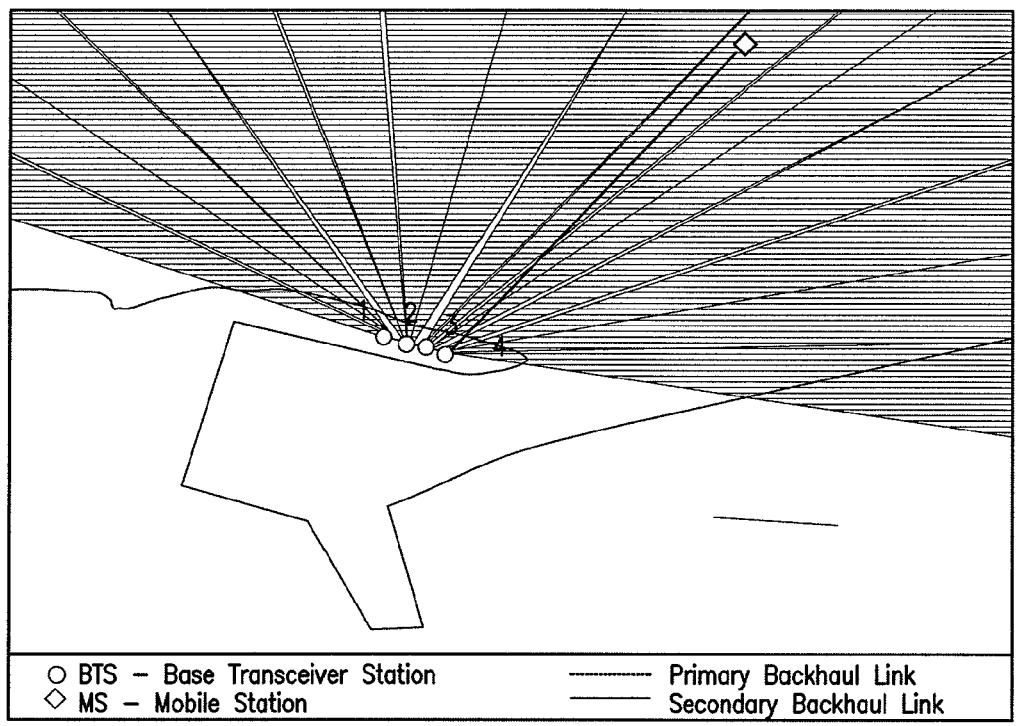
FIGS. 8A and 8B show exemplary coverage areas for alternative antenna configurations using the radio transceivers of FIGS. 1 and 2.
Figure 8B:
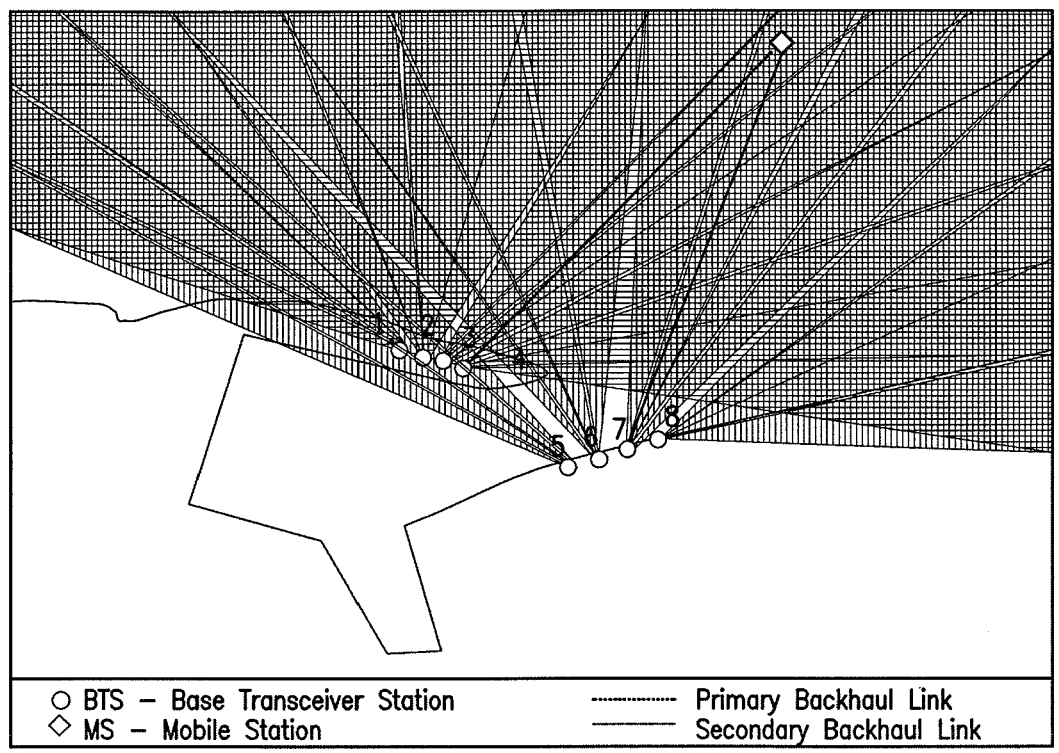

Referring to FIGS. 8A and 8B, FIG. 8A shows a harbor network configuration, with long distance links achieved via high gain antennas such as parabolic antennas. In this network configuration, full coverage of the harbor is achieved using multiple non-overlapping antenna patterns. For example, the four BelAir200D BTS units indicated in FIG. 8A as 1, 2, 3, 4 provide 180 degrees of coverage using 16 antennas with beam widths of approximately 11.25 degrees. FIG. 8B shows the same harbor network configuration as shown in FIG. 8A, but with redundant links from BTS units 5, 6, 7, and 8. Similar configurations can be used for outdoor coverage of navy, army or air force bases. BTS may be located around the perimeter and within campus, and with MS nodes on road vehicles, or as part of a mobile ground crew.

Associated with the invention is a method (algorithm) executed by the mobility controller (MC) for auto-selection of antennas and radio modules (RMs). The algorithm comprises three orthogonal and concurrent algorithms, although the first algorithm is optional and may be performed manually by network installers.

The purpose of the first algorithm is to establish network connectivity of BTS nodes. These nodes are maintained by a network management system, but must either be programmed or must otherwise learn an optimized network deployment using the following steps:

1. BTS nodes which are wired connected to the network management system (NMS) using one of the listed wired connectivity solutions are enabled to transmit beacons on each radio module (RM) containing system identification information (SSID), a medium access control (MAC) address specific to that RM, and an availability indication indicating whether the link is free or is in use, and whether it is a primary or secondary link. The selected channel is allocated from the NMS system, but could have been determined locally through a free channel selection process.
2. Other BTS nodes that are not wire connected scan all combinations of RMs, channels, and antennas, to obtain a list of available nodes, sorted by BTS signal strength with associated RM and antenna to select and establish a first optimal link to the wired BTS, setting the link status to "unavailable". Once these BTS systems have an established connectivity to the NMS, they are enabled to transmit beacons on each RM as described above.
3. Each BTS is enabled by the NMS to establish a predetermined number of links to other BTS nodes, with the remaining links reserved for MS nodes.

The above-described first algorithm is executed until the BTS nodes are all connected to the NMS and are all operational with redundant paths to the NMS system.

The purpose of the second algorithm is to establish and maintain a first optimal (primary) and second optimal (secondary) link from each MS to a BTS to establish network connectivity. This second algorithm is maintained by the mobility controller in the mobility station and relies on the BTS sending out beacons, each consisting of MAC (medium Access Control) address, a system identifier (SSID), and an availability indication as described above.

1. The MC in each MS node controls each RM to scan all available channels searching for BTS nodes, using each attached antenna, to obtain a list of available nodes, sorted by signal strength with associated RM and antenna.
2. The MC in each MS selects a first optimal combination of RM, channel, and antenna and establishes a link to the BTS node based on the signal strength. The MC then enables this primary link to carry data traffic. Primary links may steal secondary links, resulting in an iterative link optimization process.
3. The MC in each MS selects a second optimal combination of RM, channel, and antenna and establishes a link based on the signal strength. This is the secondary link and is enabled, as a hot stand-by, but does not carry data traffic.
4. The MC in each BTS compares the primary link to the secondary link, and if the primary link degrades below the secondary link, then the secondary link becomes the primary link, and the primary link becomes the secondary link.

Steps (3) and (4) are repeated indefinitely.

The purpose of the third algorithm is to establish and maintain a first optimal (primary) and second optimal (secondary) link from each of the MS-to-MS nodes to establish network connectivity. This third algorithm is maintained by the MC in the MS and relies on the availability of unconnected radios-effectively, links which are still "available". These links are the most tenuous, as they are in full mobility, and have a special "availability" status which is to indicate that they are MS-to-MS links.

This third algorithm relies on MS nodes sending out beacons, on each unconnected RM, each comprising MAC (Medium Access Control) address, a system identifier (SSID), and an availability indication, indicating whether the link is free or is in use, and whether it is a primary or secondary link.

1. The MC in each MS node controls each unconnected RM to scan all available channels searching for other MS nodes, using each attached antenna, to obtain a list of available nodes, sorted by signal strength with associated RM and antenna.
2. The MC in each MS selects a first optimal combination of RM, channel, and antenna and establishes a link to the MS node based on the signal strength. The MC then enables this primary link to carry data traffic.
3. The MC in each MS selects a second optimal combination of RM, channel, and antenna and establishes a link based on the signal strength. This is the secondary link and is enabled, as a hot stand-by, but does not carry data traffic.

4. The MC in each MS compares the primary link to the secondary link, and if the primary link degrades below the secondary link, or if the secondary link is a MS-to-BTS link, then the secondary link becomes the primary link, and the primary link becomes the secondary link.

Steps (3) and (4) are repeated indefinitely.

Moreover, the disclosure and teachings provided herein should be interpreted in view of the following. First, although the algorithms use signal strength as a metric for maintaining a link, other link quality parameters may be used, such as signal-to-noise ration (SNR), bit error rate (BER), link throughput, link capacity, or any other such meaningful metric. Second, the algorithms in all cases may be tuned by the NMS system, such as the introduction of exclusion lists, or permanent links. Third, although the algorithms show P2P links, these are merely one preferred embodiment. Point-to-multipoint (P2MP) links may be employed with the provision that the transmitted beacons include multiple instances of link information, such as separate MAC addresses for each P2MP link end point. Fourth, beacons have been described as a means to disseminate the link information. However, beacons are discloses only as one example of how this information may be transferred. In an alternative embodiment, the beacons may be suppressed, and the BTS or MS station may be required to issue "probe requests" to determine if a BTS or MS exists, and if so, to receive the details on the link status.

Although the algorithms are referred to as a "first", "second", and "third" algorithm, in a preferred embodiment of the invention, these algorithms constitute a single algorithms that is embedded within each MS and BTS. In one embodiment, the nodes are pre-provisioned to be "BTS" or "MS" nodes and therefore operate only specific aspects of the first, second, and third algorithms. In an alternative embodiment, nodes are provisioned by the NMS once connectivity is established.

While the present invention has been described with respect to what is presently considered to be the preferred embodiment, it is to be understood that the invention is not limited to the disclosed embodiments. To the contrary, the invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. A method of communication in a network, the network comprising a plurality of nodes, each node being one of a base transceiver station and a mobile station and configured for communicating with one of a plurality of substantially like nodes, and the method comprising the steps of:
   a) using a base transceiver station to transmit beacons, the beacons comprising a media access control identifier specific to a radio module associated with the base transceiver station and a usage indicator;
   b) using a mobile station to scan for beacons;
   c) using the mobile station to sort the detected beacons according to signal strength;
   d) establishing a first radio link between the mobile station and the radio module associated with the base transceiver station, wherein the selected radio module corresponds to the beacon having a greatest signal strength;
   e) setting the usage indicator of the selected radio module to an unavailable status; and
   f) repeating steps a, b, and c.

2. The method of claim 1, further comprising the step of:
   g) establishing a second radio link by repeating steps a, b, c, and d, wherein no radio traffic is carried.

3. The method of claim 2, further comprising the step of:
   h) when the signal strength of the first radio link has reached a predetermined level, using the second radio link to transmit data and terminating the first radio link.

4. A method of communication in a network, the network comprising a plurality of nodes, each node being one of a base transceiver station and a mobile station and configured for communicating with one of a plurality of substantially like nodes, and the method comprising the steps of:
   a) using a base transceiver station to transmit beacons, the beacons comprising a media access control identifier specific to a radio module associated with the base transceiver station and a usage indicator;
   b) using a mobile station to scan for beacons;
   c) using the mobile station to sort the detected beacons according to signal-to-noise ratio;
   d) establishing a first radio link between the mobile station and the radio module associated with the base transceiver station, wherein the selected radio module corresponds to the beacon having a greatest signal-to-noise ratio;
   e) setting the usage indicator of the selected radio module to an unavailable status; and
   f) repeating steps a, b, and c.

5. The method of claim 4 further comprising the step of:
   g) establishing a second radio link by repeating steps a, b, c, and d, wherein no radio traffic is carried.

6. The method of claim 5, further comprising the step of:
   h) when the signal strength of the first radio link has reached a predetermined level, using the second radio link to transmit data and terminating the first radio link.

* * * * *